US012754559B2

(12) United States Patent
Takahashi

(10) Patent No.: US 12,754,559 B2
(45) Date of Patent: Oct. 6, 2026

(54) SHIP BODY CONTROL DEVICE, SHIP BODY CONTROL SYSTEM, SHIP BODY CONTROL METHOD AND SHIP BODY CONTROL PROGRAM

(71) Applicant: FURUNO ELECTRIC CO., LTD., Hyogo (JP)

(72) Inventor: Tomoyasu Takahashi, Amagasaki (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 133 days.

(21) Appl. No.: 18/403,515

(22) Filed: Jan. 3, 2024

(65) Prior Publication Data

US 2024/0248489 A1 Jul. 25, 2024

(30) Foreign Application Priority Data

Jan. 23, 2023 (JP) ................................ 2023-008273

(51) Int. Cl.
*G05D 1/606* (2024.01)
*G05D 1/43* (2024.01)

(52) U.S. Cl.
CPC ............... *G05D 1/606* (2024.01); *G05D 1/43* (2024.01)

(58) Field of Classification Search
CPC .......... G05D 1/43; G05D 1/606; G05D 1/646; G05D 2107/27; G05D 2109/34
See application file for complete search history.

(56) References Cited

U.S. PATENT DOCUMENTS

2010/0094491 A1* 4/2010 Oehlgrien ................ G05D 1/49 73/178 R
2012/0290200 A1* 11/2012 Kabel .................... G01C 21/22 701/409
2013/0276688 A1* 10/2013 Ekuni .................... B63H 25/04 114/162
2015/0346730 A1* 12/2015 Stephens ............. G05D 1/0208 701/530
2017/0351259 A1* 12/2017 Tamura ................... B63B 79/10
2023/0192262 A1 6/2023 Sawada
2024/0134377 A1* 4/2024 Kawatani .............. B63H 21/21

FOREIGN PATENT DOCUMENTS

JP 2013-095198 A 5/2013
JP 2021-181301 A 11/2021
KR 10-2021-0083722 A 7/2021

* cited by examiner

*Primary Examiner* — Matthew J. Reda
(74) *Attorney, Agent, or Firm* — Studebaker Brackett PLLC

(57) ABSTRACT

A ship body control device (20, 20A) includes an acquiring part (40) and an estimating part (200, 200A). The acquiring part (40) acquires a ship body state and disturbance information of a ship body (80) on a water surface. The estimating part (200, 200A) generates a first estimated value (δte0, δte0*a*, δte0*b*) of a trim rudder angle (θtr) to disturbance based on information on a hydrodynamic force of the ship body (80) based on a shape of the ship body (80), and information acquired by the acquiring part (40).

13 Claims, 8 Drawing Sheets

SHIP BODY CONTROL DEVICE, SHIP BODY CONTROL SYSTEM, SHIP BODY CONTROL METHOD AND SHIP BODY CONTROL PROGRAM

CROSS-REFERENCE TO RELATED APPLICATION(S)

This application claims priority under 35 U.S.C § 119 to Japanese Patent Application No. 2023-008273, which was filed on Jan. 23, 2023, the entire disclosure of which is hereby incorporated by reference.

TECHNICAL FIELD

The present disclosure relates to a ship body control when a ship turns, in which disturbance is taken into consideration.

BACKGROUND OF THE DISCLOSURE

Some conventional autopilot controls a rudder angle using a PID control.

A ship (ship body) may be influenced by disturbance, such as wind, while the ship travels. However, it was difficult for the conventional rudder angle control to control the heading to keep it in a desired direction, when the ship is influenced by disturbance during turning of the ship (during a veering or changing a direction).

SUMMARY OF THE DISCLOSURE

Therefore, one purpose of the present disclosure is to perform a highly-precise ship body control in which the influence of disturbance is suppressed.

A ship body control device of the present disclosure includes a processing circuitry (which is also referred to as a controller). The processing circuitry acquires a ship body state of a ship body on a water surface and disturbance information. The processing circuitry generates a first estimated value of a trim rudder angle with reference to the disturbance information based on the ship body state, the disturbance information and information on a hydrodynamic force of the ship body determined by a shape of the ship body.

According to this configuration, the trim rudder angle according to disturbance is estimated. By using this estimate value of the trim rudder angle, a command rudder angle can be corrected according to disturbance. Therefore, the ship body control device is capable of setting the command rudder angle according to disturbance with high precision, and performing a highly precise ship body control while suppressing the influence of disturbance.

In the ship body control device of the present disclosure, the disturbance information may include a wind speed and a wind direction, and the ship body state may include a ship speed and a heading. Thus, information more effective for the estimation of the trim rudder angle can be acquired.

In the ship body control device of the present disclosure, the processing circuitry may generate the first estimated value when turning of the ship body. According to this configuration, the precision of the command rudder angle when turning can be increased.

In the ship body control device of the present disclosure, the processing circuitry may calculates an actual measurement of the trim rudder angle. The processing circuitry may generate a second estimated value of the trim rudder angle based on the first estimated value and the actual measurement. According to this configuration, the precision of the trim rudder angle can be further increased.

In the ship body control device of the present disclosure, the processing circuitry may calculate an instantaneous value of the trim rudder angle based on a target direction and a heading that are obtained from a direction setting of the ship body, and calculate the actual measurement based on a statistical value of the instantaneous values at a plurality of timings. According to this configuration, the precision of the actual measurement of the trim rudder angle can be increased, and the precision of the trim rudder angle can be further increased.

In the ship body control device of the present disclosure, the processing circuitry may calculate an instantaneous value when keeping the course of the ship body, and calculate the actual measurement based on a statistical value of the instantaneous values when the keeping the course. According to this configuration, the precision of the actual measurement of the trim rudder angle can be further increased, and the precision of the trim rudder angle can be further increased.

The ship body control device of the present disclosure, the processing circuitry may calculate a command rudder angle based on a target direction and a heading. The processing circuitry correct the command rudder angle calculated by the command rudder angle calculating part, based on one of the first estimated value and the second estimated value. According to this configuration, the precision of the command rudder angle outputted to the rudder mechanism can be increased.

In the ship body control device of the present disclosure, the processing circuitry may correct the command rudder angle based on the instantaneous value when keeping the course, and correct the command rudder angle based on one of the first estimated value and the second estimated value when turning. According to this configuration, a command rudder angle suitable for the traveling state of the ship body can be outputted to the rudder mechanism.

In the ship body control device of the present disclosure, the shape of the ship body may include a length, an amount of draft, and a width of the ship body. The processing circuitry may calculate a value including a derivative related to a hydrodynamic force based on the shape of the ship body, as the information on the hydrodynamic force. The processing circuitry may generate the first estimated value based on the information on the hydrodynamic force calculated by the derivative calculating part. According to this configuration, the first estimate value can be generated with high precision.

In the ship body control device of the present disclosure, the processing circuitry may calculate an estimated value of the trim rudder angle before turning, and an estimated value of the trim rudder angle after turning, based on the information on the hydrodynamic force of the ship body, and the information acquired by the acquiring part. The processing circuitry may calculate an actual measurement of the trim rudder angle immediately after turning is started, based on the target direction and the heading that are obtained from the direction setting of the ship body. The processing circuitry may generate a third estimated value of the trim rudder angle after turning, based on the actual measurement of the trim rudder angle immediately after turning is started, the estimated value of the trim rudder angle before turning, and the estimated value of the trim rudder angle after turning. The processing circuitry may generate a fourth estimated value of the present trim rudder angle, based on the present heading, the present direction setting, the direction setting before turning, the actual measurement of the trim rudder angle immediately after turning is started, and the third estimated value.

According to this configuration, the precision of the trim rudder angle can be increased.

BRIEF DESCRIPTION OF DRAWINGS

The present disclosure is illustrated by way of example and not by way of limitation in the figures of the accompanying drawings, in which the like reference numerals indicate like elements and in which.

DETAILED DESCRIPTION OF THE DISCLOSURE

First Embodiment

Figure 1:
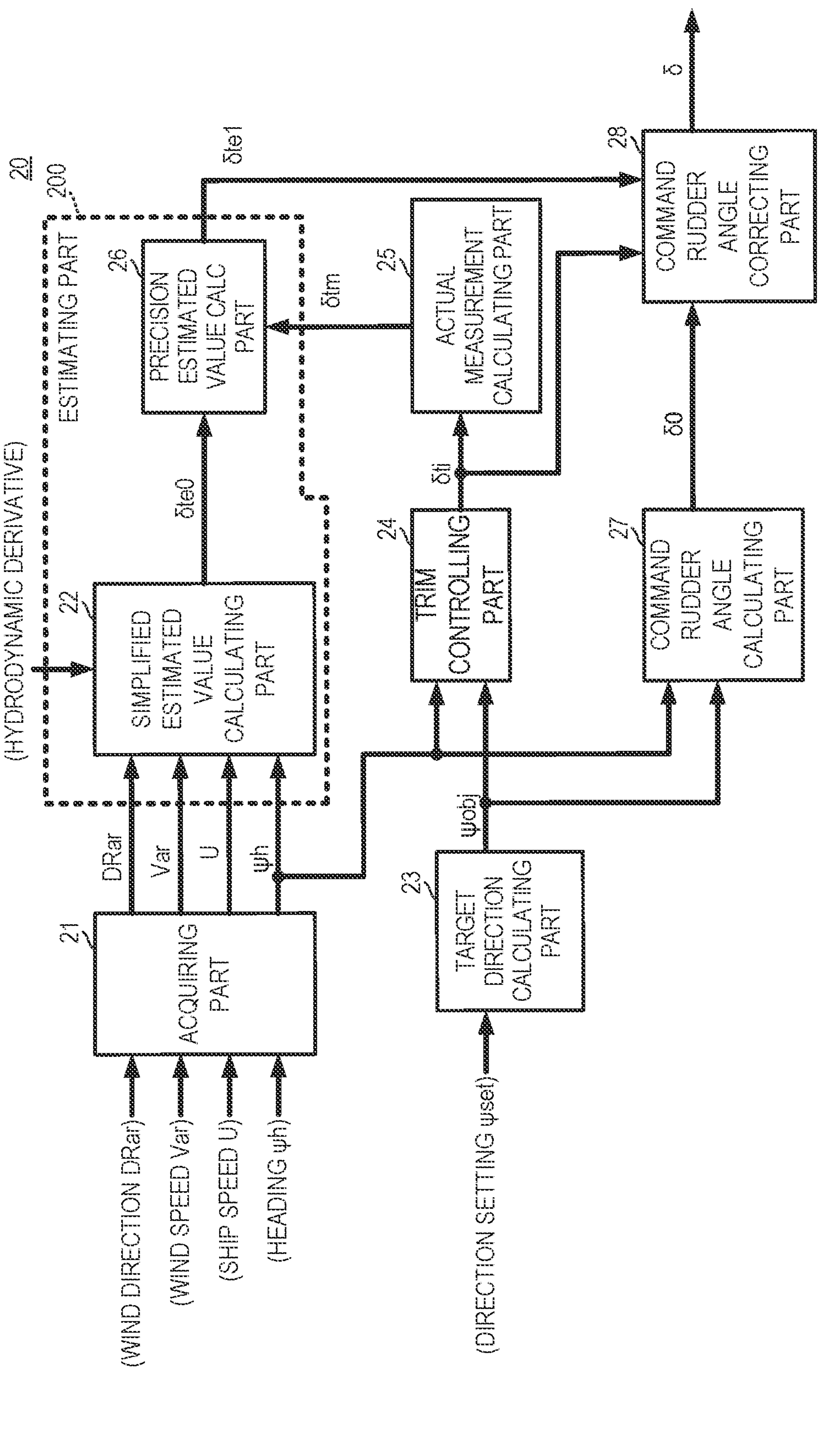
FIG. 1 is a functional block diagram illustrating a configuration of a controller according to a first embodiment of the present disclosure.
Figure 2:
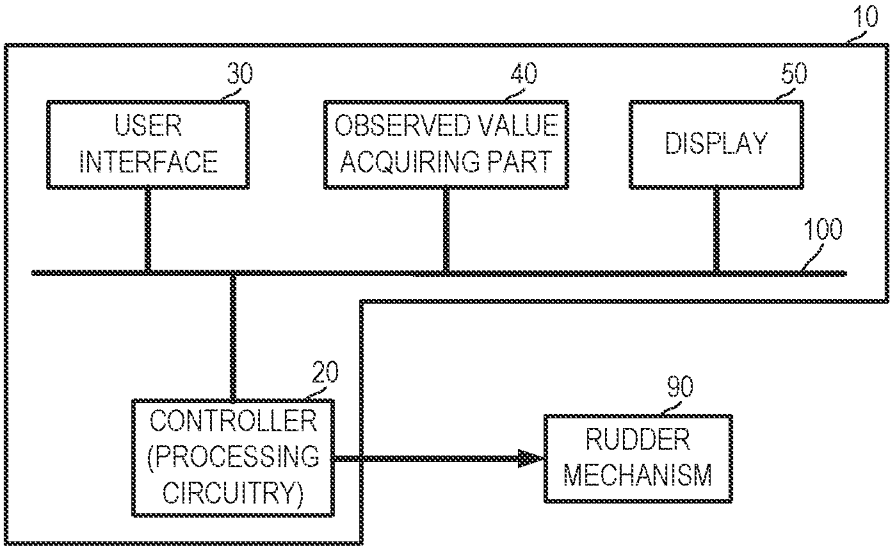
FIG. 2 is a functional block diagram illustrating a configuration of a ship body control system according to the first embodiment of the present disclosure.

Hereinafter, a ship body control device, a ship body control system, a ship body control method, and a ship body control program according to a first embodiment of the present disclosure are described with reference to the accompanying drawings. FIG. 1 is a functional block diagram illustrating a configuration of a controller according to the first embodiment of the present disclosure. FIG. 2 is a functional block diagram illustrating a configuration of the ship body control system according to the first embodiment of the present disclosure.

(Configuration of Ship Body Control System 10)

First, a configuration of a ship body control system 10 is described using FIG. 2. As illustrated in FIG. 2, the ship body control system 10 may include a controller 20, a user interface 30, an observed value acquiring part 40, and a display 50. The ship body control system 10 may be mounted on a ship body (e.g., a hull) of a ship which performs an autopilot control (automatic navigation control). The controller 20 corresponds to a "ship body control device" of the present disclosure.

The controller 20 of the ship body control system 10 may be connected to a rudder or steering mechanism 90. The rudder mechanism 90 may be mounted on the ship body. The controller 20 and the rudder mechanism 90 may be connected with each other, for example, through an analog voltage signal line or a data-communications line.

Note that, although illustration is omitted, a propelling force generator, such as a screw propeller, may also be mounted on the ship body. The controller 20 may also perform a propelling force generation control for the propelling force generator, but the detailed explanation thereof will be omitted herein.

The controller 20, the user interface 30, the observed value acquiring part 40, and the display 50 may be connected with each other, for example, via a data communication network 100 for ships.

The controller 20 may perform various kinds of controls in the autopilot control. The controller 20 may generate a steering signal based on a command rudder angle, and output it to the rudder mechanism 90. The rudder mechanism 90 may control a rudder according to the received steering signal.

At this time, the controller 20 may calculate a trim rudder angle, correct a command rudder angle δ0 by the trim rudder angle, and generate a steering signal based on a corrected command rudder angle δ. The controller 20 may perform different corrections between when keeping the course and when turning (when veering or changing the course). A concrete generating method for the corrected command rudder angle δ will be described later. Note that when keeping the course and when turning (when changing the course) can be discriminated, for example, based on a relationship between a direction setting ψset or a target direction ψobj, and a heading ψh in the autopilot control (a relationship over time).

Figure 3A:
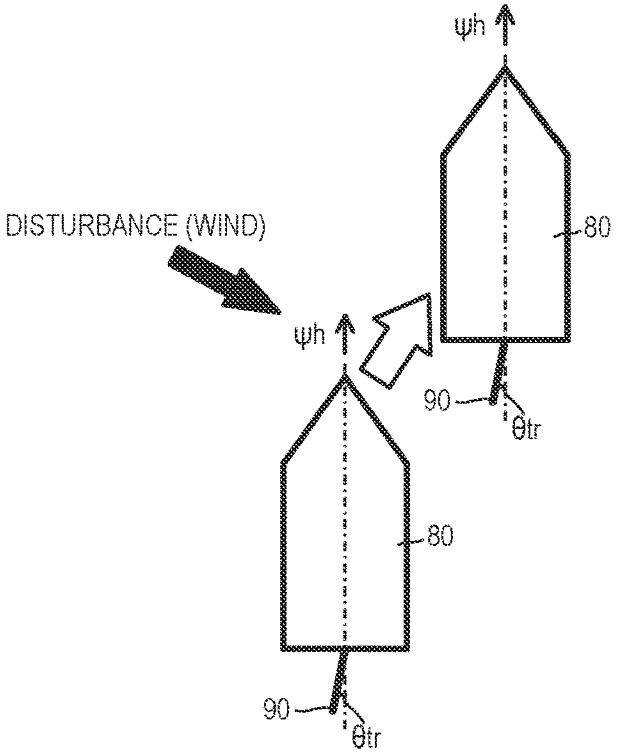
FIGS. 3A and 3B are views illustrating a concept of a trim rudder angle θtr.
Figure 3B:
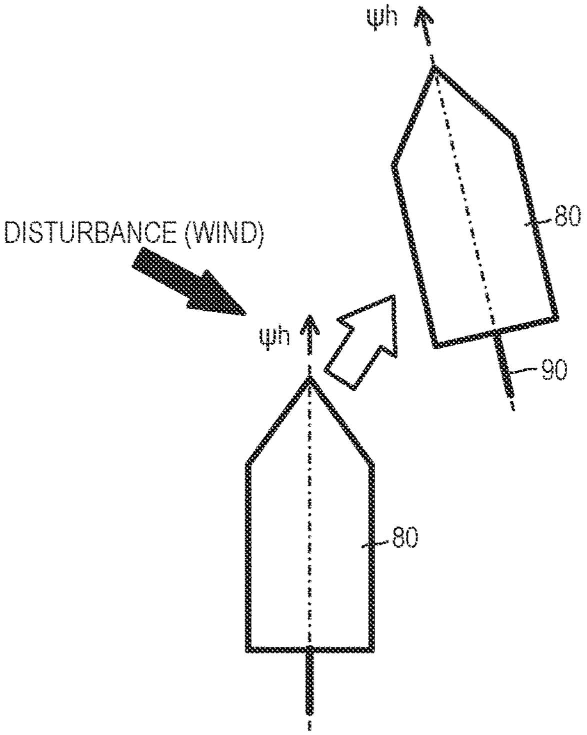

FIGS. 3A and 3B are views illustrating a concept of a trim rudder angle θtr. FIG. 3A illustrates behavior of the ship body when the trim rudder angle θtr is set, and FIG. 3B illustrates behavior of the ship body when the trim rudder angle θtr is not set.

As illustrated in FIGS. 3A and 3B, when a ship body 80 receives disturbance (for example, wind), the behavior of the ship body 80 may be influenced by the disturbance. The trim rudder angle θtr may correspond to the rudder angle of the rudder mechanism 90, and may be set so that the posture (heading ψh) will not change, even if the ship body 80 is influenced by disturbance. That is, if the trim rudder angle θtr is set properly, the influence of disturbance will be suppressed and the heading ψh of the ship body 80 will not change substantially, as illustrated in FIG. 3A.

On the other hand, if the trim rudder angle θtr is not set properly, the heading ψh of the ship body 80 may change in response to the influence of disturbance, as illustrated in FIG. 3B.

Therefore, by the controller 20 setting the trim rudder angle θtr properly and making the trim rudder angle θtr be included in the command rudder angle (corrected command rudder angle) 6, the ship body control system 10 can maintain the ship body 80 at a desired posture.

The user interface 30 may be realized, for example, by a touch panel, a physical button, a physical switch, etc. The user interface 30 may accept operation for a setup relevant to the autopilot control including a target position etc. The user interface 30 may output information set by the operation (the target position etc.) to the controller 20.

The observed value acquiring part 40 may include various sensors which observe the behavior of the ship body 80 and disturbance. For example, the observed value acquiring part 40 may include an anemometer, a ship speed sensor, a direction sensor, and a positioning sensor. That is, the observed value acquiring part 40 may acquire a ship body state of the ship body 80 on the water surface, and disturbance information.

The anemometer may observe a wind direction DRar and a wind speed Var. The ship speed sensor may observe a ship speed U. The direction sensor may observe the heading ψh. The positioning sensor may observe the position of the ship body 80.

The ship speed sensor, the direction sensor, and the positioning sensor may be individual sensors, or may be a single integrated sensor (for example, a positioning attitude sensor using GNSS signals).

The observed value acquiring part 40 may output the wind direction DRar, the wind speed Var, the ship speed U, and the heading ψh to the controller 20.

The display 50 may be realized, for example, by a liquid crystal panel etc. For example, when the information relevant to the autopilot control (for example, a traveling state (behavior) of the ship body 80) is inputted from the controller 20, the display 50 may display the information. Note that, although the display 50 may be omitted, it may be provided so that the user can easily grasp an autopilot control state etc. because of the existence of the display 50.

(Configuration and Concrete Processing of Controller 20)

For example, the controller 20 may be comprised of a processor, such as a CPU, and a memory, such as a semiconductor memory. The memory may store a program executed by the controller 20. Further, the memory may be used when the CPU performs calculations. The controller 20 may realize the following functions by executing the program stored in the memory.

As illustrated in FIG. 1, functionally, the controller 20 may include an acquiring part 21, a simplified estimated value calculating part 22, a target direction calculating part 23, a trim controlling part 24, an actual measurement calculating part 25, a precision estimated value calculating part 26, a command rudder angle calculating part 27, and a command rudder angle correcting part 28.

The wind direction DRar, the wind speed Var, the ship speed U, and the heading ψh may be inputted into the controller 20. The acquiring part 21 may acquire the wind direction DRar, the wind speed Var, the ship speed U, and the heading ψh. That is, the acquiring part 21 may acquire the ship body state of the ship body 80 on the water surface and the disturbance information. The ship body information may include the ship speed U and the heading ψh, and the disturbance information may include the wind direction DRar and the wind speed Var.

The acquiring part 21 may output the wind direction DRar, the wind speed Var, the ship speed U, and the heading ψh to the simplified estimated value calculating part 22. Further, the acquiring part 21 may output the heading ψh to the trim controlling part 24 and the command rudder angle calculating part 27.

Moreover, the position and the target position of the ship body 80 may be inputted into the controller 20. The controller 20 may determine the direction setting ψset in the autopilot control based on the position and the target position of the ship body 80. The direction setting ψset may be inputted into the target direction calculating part 23.

Information on a hydrodynamic force of the ship body, which is set based on the shape of the ship body 80, may be inputted into the simplified estimated value calculating part 22. The shape of the ship body 80 may include, for example, a full length of the ship body 80, an amount of draft (a height of the draft), and the width of the ship body 80. The full length of the ship body 80 may be a length between perpendiculars. The information on the hydrodynamic force of the ship body may be a hydrodynamic derivative. The simplified estimated value calculating part 22 corresponds to a “derivative calculating part” of the present disclosure.

Concretely, the hydrodynamic derivative may include at least one of a rudder area, a rate of increase of a rudder normal force with respect to a ship body lateral component, a wake coefficient at the rudder position, coordinates of rudder normal force acting point, a coefficient indicative of a rectifying effect, coordinates of a ship body lateral force component acting point due to steering, a rudder normal force slope coefficient, a projected area of the ship body in the longitudinal direction, a lateral wind pressure coefficient, and a wind pressure coefficient in the yaw direction.

The simplified estimated value calculating part 22 may calculate (generate) a first estimated value δte0 of the trim rudder angle based on the wind direction DRar, the wind speed Var, the ship speed U, the heading ψh, and the hydrodynamic derivative.

The simplified estimated value calculating part 22 may calculate the first estimated value δte0 of the trim rudder angle, for example, by using the following formula.

$$\delta te0 = K \cdot (\mathrm{Var}^2 / U^2)$$

Here, K may be a coefficient set based on a relative wind direction obtained from the wind direction DRar and the heading ψh, and the hydrodynamic derivative.

According to such a calculation, the first estimated value δte0 of the trim rudder angle may become a value obtained by estimating a trim rudder angle which suppresses the influence of disturbance given to the behavior of the ship body 80, while using the shape of the ship body 80 as a main element.

The simplified estimated value calculating part 22 may output the first estimated value δte0 of the trim rudder angle to the precision estimated value calculating part 26.

The target direction calculating part 23 may calculate a target direction ψobj, for example, based on the direction setting ψset. The target direction calculating part 23 may suitably update the target direction ψobj according to the traveling state of the ship body 80 during the autopilot control so that the heading ψh approaches the direction setting ψset. The target direction calculating part 23 may output the target direction ψobj to the trim controlling part 24 and the command rudder angle calculating part 27.

The target direction ψobj and the heading ψh may be inputted into the trim controlling part 24. The trim controlling part 24 may calculate an instantaneous value δti of the trim rudder angle based on the target direction ψobj and the heading ψh.

Conceptually, the trim controlling part 24 may calculate the instantaneous value δti of the trim rudder angle at a timing when it calculates the instantaneous value δti of the trim rudder angle so that the influence of disturbance is suppressed, as described above. For example, the trim controlling part 24 may use an integral control or a disturbance observer as a calculation algorithm of the instantaneous value δti of the trim rudder angle. The trim controlling part 24 may output the instantaneous value δti of the trim rudder angle to the actual measurement calculating part 25 and the command rudder angle correcting part 28.

The actual measurement calculating part 25 may calculate a statistical value of the instantaneous value δti of the trim rudder angle at a plurality of timings when keeping the course, and output it as an actual measurement δtm of the trim rudder angle. A moving average may be used as the statistical value. Alternatively, the statistical value may be a median of the instantaneous value δti during a given period of time from the past to the present. The actual measurement calculating part 25 may output the actual measurement δtm of the trim rudder angle to the precision estimated value calculating part 26.

The first estimated value δte0 of the trim rudder angle and the actual measurement δtm of the trim rudder angle may be inputted into the precision estimated value calculating part 26. The precision estimated value calculating part 26 may calculate (generate) a second estimated value δte1 of the trim rudder angle based on the first estimated value δte0 of the trim rudder angle and the actual measurement δtm of the trim rudder angle. The simplified estimated value calculating part 22 and the precision estimated value calculating part 26 may constitute an estimating part 200.

In detail, the precision estimated value calculating part 26 may calculate the second estimated value δte1 of the trim rudder angle based on the first estimated value δte0 of the trim rudder angle in the present heading, a first estimated value δte0*b* of the trim rudder angle before turning, and the actual measurement δtm of the trim rudder angle in the present heading. Note that the first estimated value δte0*b* of the trim rudder angle before turning may be an estimated value calculated when keeping the course, before performing the turning (veering) control in which the trim rudder angle of this time is estimated, in other words, at a timing when changing to the turning of this time from the course-keeping state immediately before the turning of this time.

The precision estimated value calculating part 26 may calculate the second estimated value δte1 of the trim rudder angle, for example, using the following formula.

$$\delta te1 = \delta tm \cdot (\delta te0/\delta te0b)$$

According to this processing, the second estimated value δte1 of the trim rudder angle may be calculated based on the first estimated value δte0 of the trim rudder angle estimated while the shape of the ship body 80 is used as the main element, and the actual measurement δtm of the trim rudder angle. Therefore, the second estimated value δte1 of the trim rudder angle reflects even more precisely the behavior of the ship body 80 when turning.

The precision estimated value calculating part 26 may output the second estimated value δte1 of the trim rudder angle to the command rudder angle correcting part 28.

The heading ψh and the target direction ψobj may be inputted into the command rudder angle calculating part 27. The command rudder angle calculating part 27 may calculate the command rudder angle δ0 based on the heading ψh and the target direction ψobj by using a known calculation algorithm (for example, a PD control). Since such a calculation method is used, the trim rudder angle may not be included in the command rudder angle δ0. The command rudder angle calculating part 27 may output the command rudder angle δ0 to the command rudder angle correcting part 28.

The command rudder angle δ0, the instantaneous value δti of the trim rudder angle, and the second estimated value δte1 of the trim rudder angle may be inputted into the command rudder angle correcting part 28. The command rudder angle correcting part 28 may correct the command rudder angle δ0 by using different methods between when keeping the course and when turning (when changing the course).

(When Keeping the Course)

The command rudder angle correcting part 28 may correct the command rudder angle 60 using the instantaneous value δti of the trim rudder angle. In detail, the command rudder angle correcting part 28 may calculate the corrected command rudder angle δ, for example, by using the following formula.

$$\delta = \delta 0 + \delta ti$$

(When Turning (Changing the Course))

The command rudder angle correcting part 28 may correct the command rudder angle 60 using the second estimated value δte1 of the trim rudder angle. In detail, the command rudder angle correcting part 28 may calculate the corrected command rudder angle δ, for example, by using the following formula.

$$\delta = \delta 0 + \delta te1$$

The command rudder angle correcting part 28 may output the corrected command rudder angle δ. The controller 20 may generate a steering signal based on the corrected command rudder angle δ, and output it to the rudder mechanism 90.

By performing such processing, the corrected command rudder angle δ becomes a value reflecting the trim rudder angle which suppresses the influence of disturbance. Therefore, the controller 20 can output the corrected command rudder angle δ from which the influence of disturbance is deducted. Therefore, the ship body control system 10 can perform the ship body control (for example, autopilot control) while suppressing the influence of disturbance, by performing the ship body control using the steering signal based on the corrected command rudder angle δ.

Further, according to this configuration and processing, the command rudder angle 60 may be corrected based on the instantaneous value δti of the trim rudder angle when keeping the course, and the command rudder angle δ0 may be corrected based on the second estimated value δte1 of the trim rudder angle when turning. Therefore, the controller 20 can output the corrected command rudder angle δ suitable for each of the case when keeping the course and the case when turning. Therefore, the ship body control system 10 can perform the ship body control (for example, the autopilot control) while suppressing the influence of disturbance both when keeping the course and when turning.

Note that the controller 20 may also use the first estimated value δte0 of the trim rudder angle for the correction of the command rudder angle δ0 when turning. However, by using the second estimated value δte1 of the trim rudder angle, the controller 20 can suppress the influence of disturbance more precisely.

(Ship Body Control Method 1)

Figure 4:
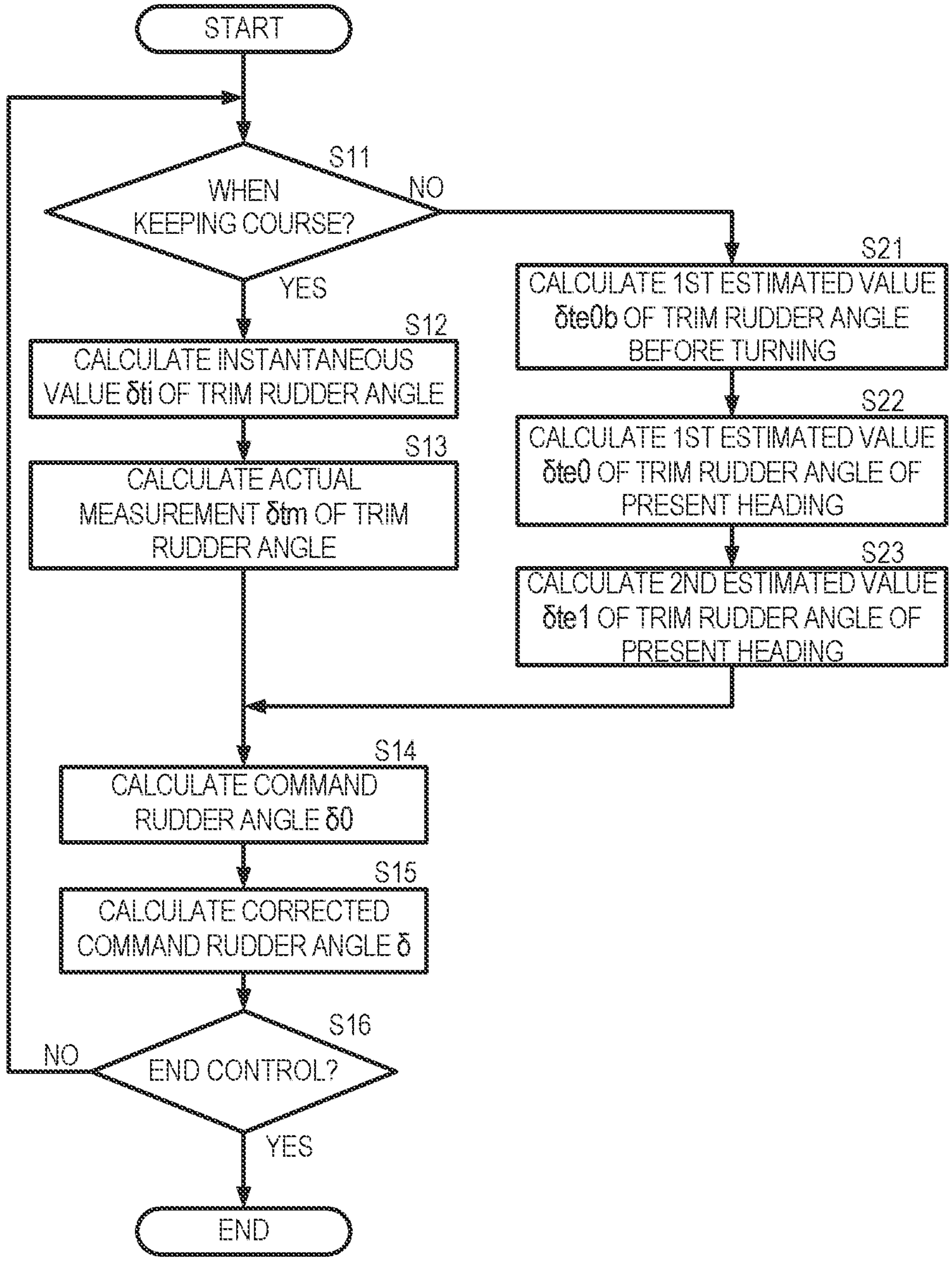
FIG. 4 is a flowchart illustrating one example of a ship body control method according to the first embodiment of the present disclosure.

FIG. 4 is a flowchart illustrating one example of the ship body control method according to the first embodiment of the present disclosure. Note that the concrete contents of each processing illustrated in the flowchart of FIG. 4 have already been described above, and only parts with the necessity for additional explanation will be described below.

(While Keeping the Course)

The controller 20 may identify whether it is "when keeping the course" or "when turning," and if it is "when keeping the course" (S11: YES), the controller 20 may calculate the instantaneous value δti of the trim rudder angle (S12).

The controller 20 may calculate the actual measurements δtm of the trim rudder angle based on the instantaneous values δti of the trim rudder angle at a plurality of time points (S13).

The controller 20 may calculate the command rudder angle δ0 (S14). The controller 20 may correct the command rudder angle δ0 based on the instantaneous value δti of the present trim rudder angle, and calculate the corrected command rudder angle δ when keeping the course (S15).

(When Turning (Veering or Changing the Course))

If it is not "when keeping the course," in other words, it is "when turning" (S11: NO), the controller 20 may calculate the first estimated value δte0*b* of the trim rudder angle before turning (S21). The controller 20 may calculate the first estimated value δte0 of the trim rudder angle of the present heading (S22).

The controller 20 may calculate the second estimated value δte1 of the trim rudder angle based on the first estimated value δte0*b* of the trim rudder angle before turning, the first estimated value δte0 of the trim rudder angle of the present heading, and the actual measurement δtm of the trim rudder angle of the present heading (S23).

The controller 20 may calculate the command rudder angle δ0 (S14). The controller 20 may correct the command rudder angle δ0 based on the second estimated value δte1 of the trim rudder angle, and calculate the corrected command rudder angle δ when turning (S15).

(Simulation Results)

Figure 5A:
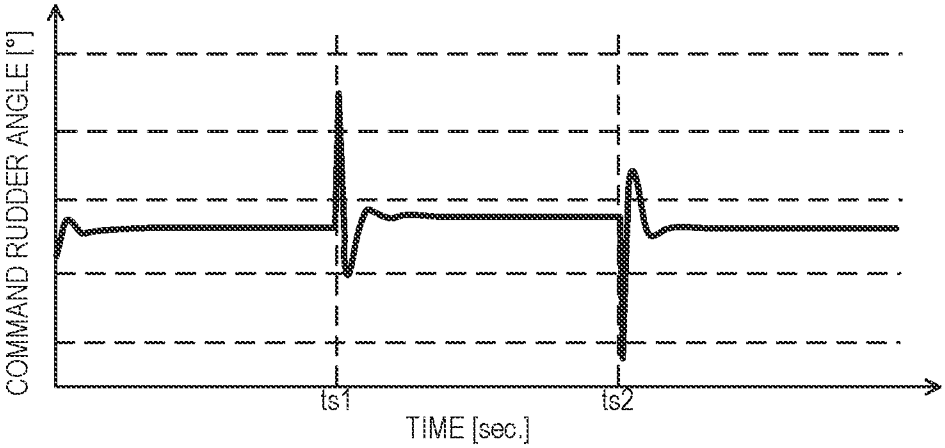
FIG. 5A is a view illustrating a temporal change in a corrected command rudder angle in the ship body control system according to the first embodiment of the present disclosure.
Figure 5B:
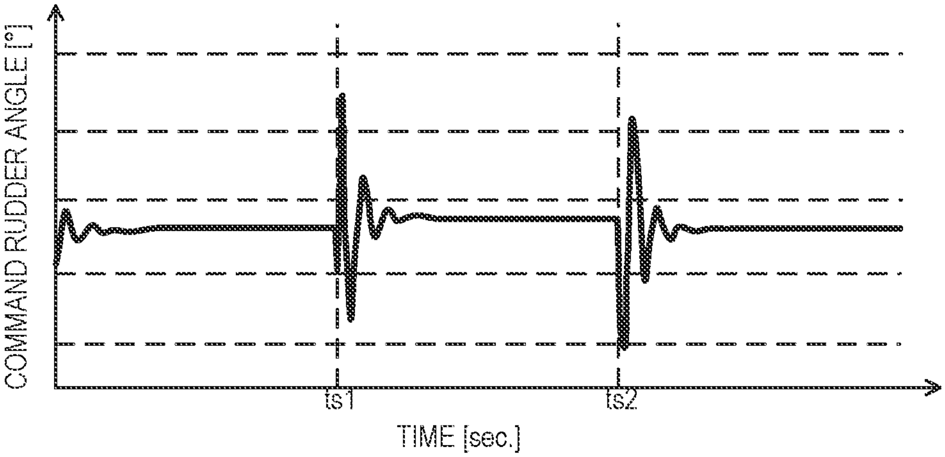
FIG. 5B is a view illustrating a temporal change in a command rudder angle in a comparative example.
Figure 6A:
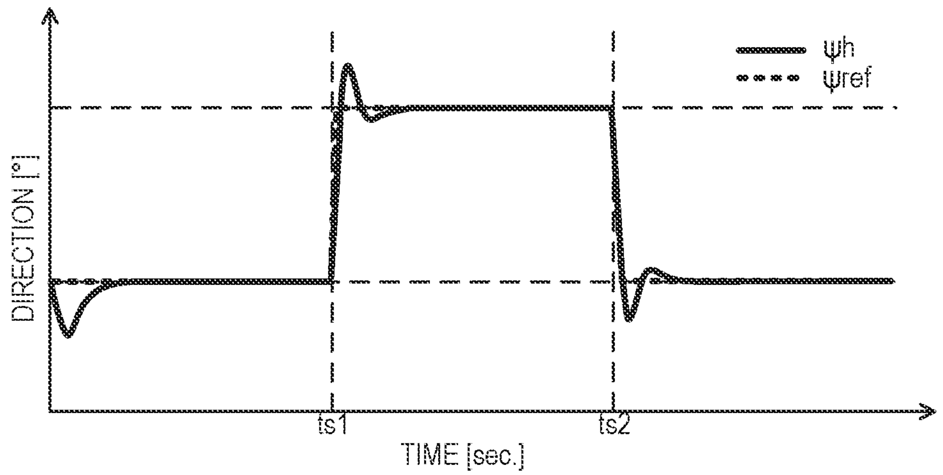
FIG. 6A is a view illustrating a temporal change in a relationship between a heading and a direction setting in the ship body control system according to the first embodiment of the present disclosure.
Figure 6B:
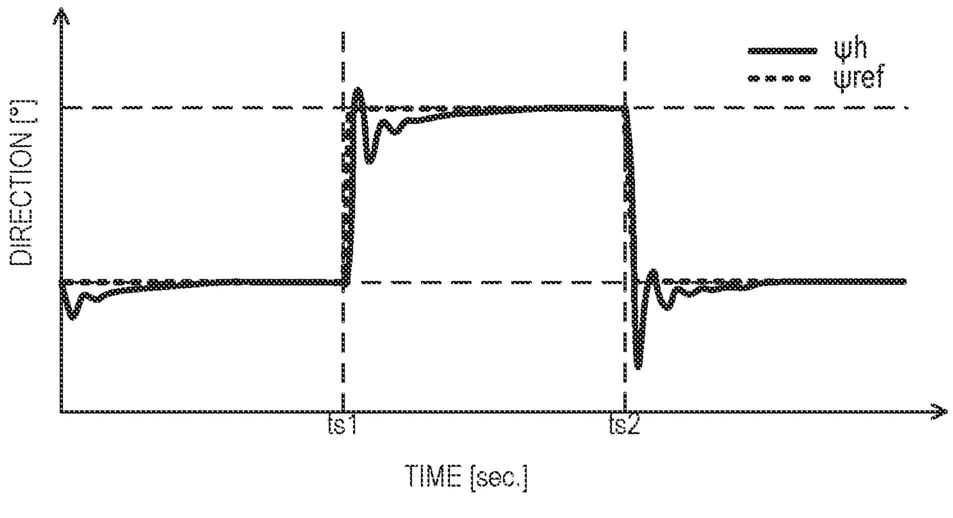
FIG. 6B is a view illustrating a temporal change in a relationship between a heading and a direction setting in a comparative example.

FIG. 5A is a view illustrating a temporal change in the corrected command rudder angle in the ship body control system according to the first embodiment of the present disclosure, and FIG. 5B is a view illustrating a temporal change in the command rudder angle in the comparative example. FIG. 6A is a view illustrating a temporal change in the relationship between the heading and the direction setting in the ship body control system according to the first embodiment of the present disclosure, and FIG. 6B is a view illustrating a temporal change in a relationship between the heading and the direction setting in the comparative example.

FIGS. 5A and 5B, and FIGS. 6A and 6B illustrate simulation results of a situation where disturbance (wind) hits the ship body. In FIGS. 5A and 5B, and FIGS. 6A and 6B, ts1 and ts2 in the horizontal axis are timings of turning. Further, the comparative example is one example in which the command rudder angle is not corrected based on the trim rudder angle when turning as described above.

As illustrated in FIGS. 5A and 5B, in the ship body control system 10 of the present disclosure, the command rudder angle converges quicker than in the comparative example when turning. As illustrated in FIGS. 6A and 6B, the ship body control system 10 of the present disclosure can make the heading ψh follow the direction setting ψset quicker than in the comparative example when turning.

Thus, by correcting the trim rudder angle as described above, the ship body control system 10 can suppress the influence of disturbance to realize the highly-precise ship body control.

Second Embodiment

Figure 7:
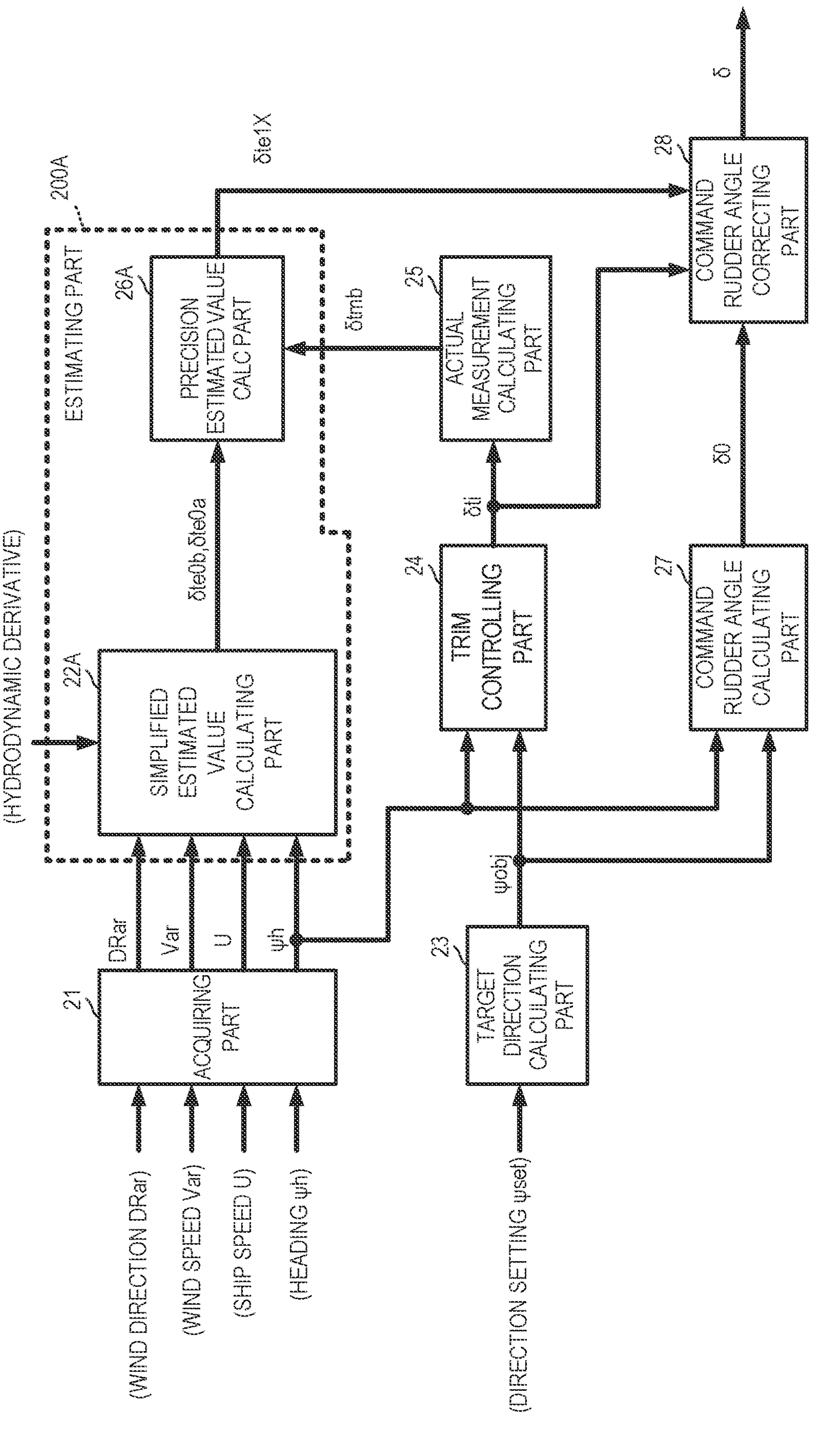
FIG. 7 is a functional block diagram illustrating a configuration of a controller according to a second embodiment of the present disclosure.

A ship body control device, a ship body control system, a ship body control method, and a ship body control program according to a second embodiment of the present disclosure are described with reference to the drawings. FIG. 7 is a functional block diagram illustrating a configuration of a controller according to the second embodiment of the present disclosure.

The ship body control system according to the second embodiment differs from the ship body control system 10 according to the first embodiment in a configuration of a controller 20A, and calculation processing of the estimated value of the trim rudder angle which is used for the correction of the command rudder angle δ0. Other configurations and processings of the ship body control system according to the second embodiment are similar to those of the ship body control system 10 according to the first embodiment, and therefore, explanation of similar parts will be omitted.

The controller 20A may include a simplified estimated value calculating part 22A and a precision estimated value calculating part 26A. The simplified estimated value calculating part 22A and the precision estimated value calculating part 26A may constitute an estimating part 200A.

The simplified estimated value calculating part 22A may calculate a first estimated value δte0*b* of the trim rudder angle before turning based on a ship speed Ub before turning, a wind speed Var before turning, a wind direction DRar before turning, a heading ψh before turning, and a hydrodynamic derivative.

The simplified estimated value calculating part 22A may calculate a first estimated value δte0*a* of the trim rudder angle after turning based on an estimated value of a ship speed Ua after turning, an estimated value of the wind speed Var after turning, an estimated value of the wind direction DRar after turning, an estimated value of the heading ψh after turning, and the hydrodynamic derivative.

The first estimated value δte0*b* of the trim rudder angle before turning and the first estimated value δte0*a* of the trim rudder angle after turning may be inputted into the precision estimated value calculating part 26A from the simplified estimated value calculating part 22A. An actual measurement δtmb of the trim rudder angle immediately after turning is started may be inputted into the precision estimated value calculating part 26A from the actual measurement calculating part 25. The present heading ψh, the present direction setting ψset, and direction setting ψsetb before turning may be inputted into the precision estimated value calculating part 26A.

The precision estimated value calculating part 26A may calculate (generate) a third estimated value δtma of the trim rudder angle after turning based on the actual measurement δtmb of the trim rudder angle immediately after turning is started, the first estimated value δte0*b* of the trim rudder angle before turning, and the first estimated value δte0*a* of the trim rudder angle after turning.

In detail, the precision estimated value calculating part 26A may calculate the third estimated value δtma of the trim rudder angle after turning, for example, by using the following formula.

$$\delta tma = \delta tmb \cdot (\delta te0a/\delta te0b)$$

The precision estimated value calculating part 26A may calculate (generate) a fourth estimated value δte1X of the trim rudder angle of the present heading based on the third estimated value δtma of the trim rudder angle after turning, the present heading ψh, the present direction setting ψset, and the direction setting ψsetb before turning.

In detail, the precision estimated value calculating part 26A may calculate the fourth estimated value δte1X of the trim rudder angle of the present heading, for example, by using the following formula.

$$\delta te1X = \delta tma - \{(\psi set - \psi h)/(\psi set - \psi setb)\} \cdot (\delta tma - \delta tm0b)$$

The precision estimated value calculating part 26A may output the fourth estimated value δte1X of the trim rudder angle of the present heading to the command rudder angle correcting part 28.

By such a configuration and processing, the controller 20A can calculate the trim rudder angle for suppressing the influence of disturbance with high precision.

(Ship Body Control Method 2)

Figure 8:
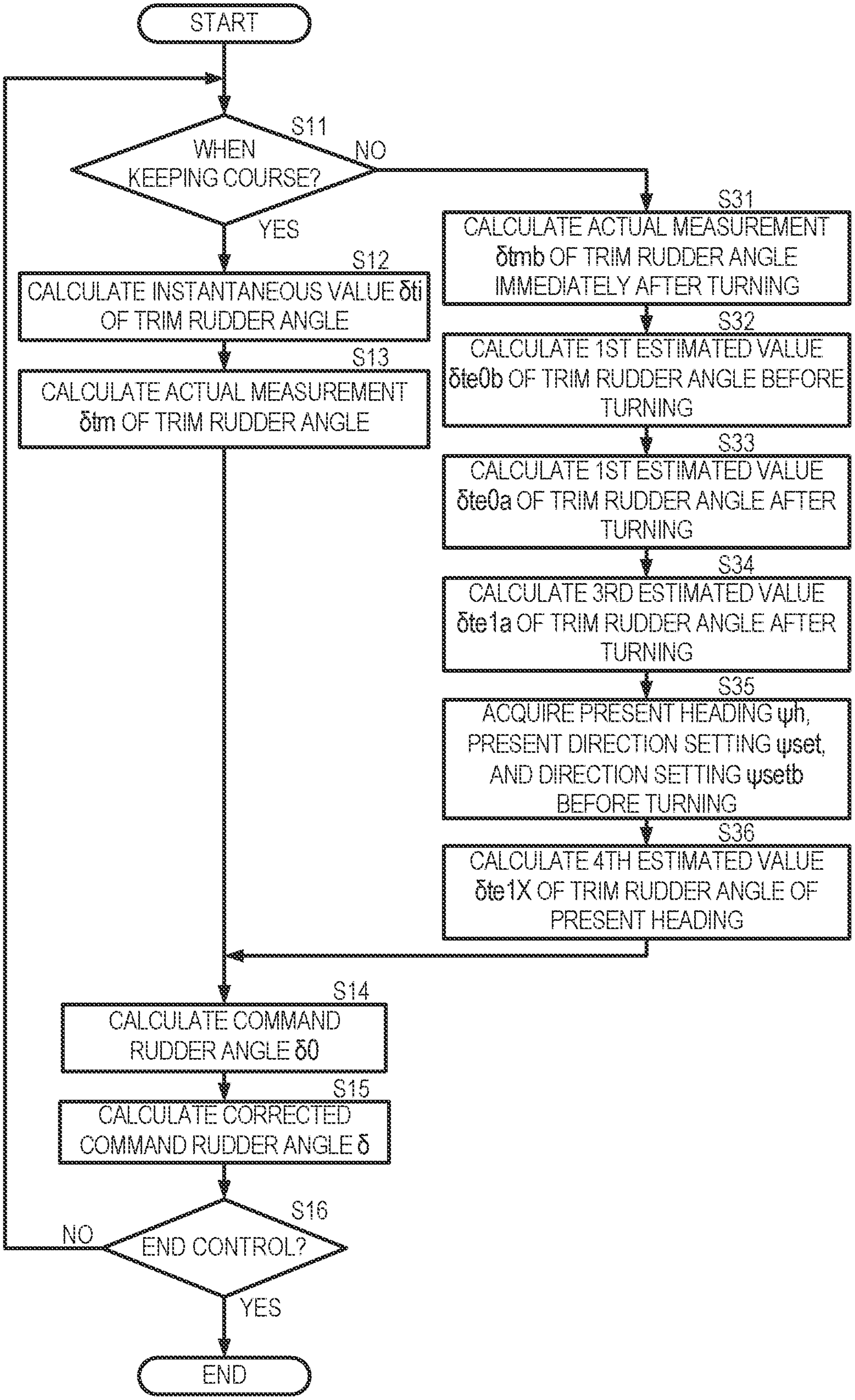
FIG. 8 is a flowchart illustrating one example of a ship body control method according to the second embodiment of the present disclosure.

FIG. 8 is a flowchart illustrating one example of the ship body control method according to the second embodiment of the present disclosure. Note that concrete contents of each processing illustrated in the flowchart of FIG. 8 have been described above, and therefore, only the part with the necessity for additional explanation will be described below.

(While Keeping the Course)

The controller 20A may identify whether it is "when keeping the course" or "when turning," and if it is "when keeping the course" (S11: YES), the controller 20A may calculate the instantaneous value δti of the trim rudder angle (S12).

The controller 20A may calculate the actual measurement δtm of the trim rudder angle based on the instantaneous value δti of the trim rudder angle at a plurality of time points (S13).

The controller 20A may calculate the command rudder angle δ0 (S14). The controller 20A may correct the command rudder angle δ0 based on the instantaneous value δti of the present trim rudder angle, and calculate the corrected command rudder angle δ when keeping the course (S15).

(While Turning (While Veering or Changing the Course))

If it is not "when keeping the course," in other words, if it is "when turning" (S11: NO), the controller 20A may calculate the actual measurement δtmb of the trim rudder angle immediately after turning (S31).

The controller 20A may calculate the first estimated value δte0*b* of the trim rudder angle before turning (S32). The controller 20A may calculate the first estimated value δte0*a* of the trim rudder angle after turning (S33).

The controller 20A may calculate the third estimated value δte1*a* of the trim rudder angle after turning based on the actual measurement δtmb of the trim rudder angle immediately after turning, the first estimated value δte0*b* of the trim rudder angle before turning, and the first estimated value δte0*a* of the trim rudder angle after turning (S34).

The controller 20A may acquire the present heading ψh, the present direction setting ψset, and the direction setting ψsetb before turning (S35).

The controller 20A may calculate the fourth estimated value δte1X of the trim rudder angle of the present heading based on the third estimated value δte1*a* of the trim rudder angle after turning, the present heading ψh, the present direction setting ψset, and the direction setting ψsetb before turning (S36).

The controller 20A may calculate the command rudder angle δ0 (S14). The controller 20A may correct the command rudder angle δ0 based on the fourth estimated value δte1X of the trim rudder angle of the present heading, and calculate the corrected command rudder angle δ when turning (S15).

(1) A ship body control device, comprising:

an acquiring part configured to acquire a ship body state and disturbance information of a ship body on a water surface;

an estimating part configured to generate a first estimated value of a trim rudder angle to disturbance based on information on a hydrodynamic force of the ship body based on a shape of the ship body, and information acquired by the acquiring part.

(2) The ship body control device of (1), wherein the disturbance information includes a wind speed and a wind direction, and the ship body state includes a ship speed and a heading.

(3) The ship body control device of (1) or (2), wherein the estimating part generates the first estimated value when turning of the ship body.

(4) The ship body control device of any one of (1) to (3), comprising an actual measurement calculating part configured to calculate an actual measurement of the trim rudder angle, wherein the estimating part generates a second estimated value of the trim rudder angle based on the first estimated value and the actual measurement.

(5) The ship body control device of (4), wherein the actual measurement calculating part calculates an instantaneous value of the trim rudder angle based on a target direction and a heading that are obtained from a direction setting of the ship body, and calculates the actual measurement based on a statistical value of the instantaneous values at a plurality of timings.

(6) The ship body control device of (4), wherein the actual measurement calculating part calculates an instantaneous value when keeping the course of the ship body, and calculates the actual measurement based on a statistical value of the instantaneous values when the keeping the course.

(7) The ship body control device of any one of (4) to (6), comprising:

a command rudder angle calculating part configured to calculate a command rudder angle based on a target direction and a heading; and a command rudder angle correcting part configured to correct the command rudder angle calculated by the command rudder angle calculating part, based on one of the first estimated value and the second estimated value.

(8) The ship body control device of (7), wherein the command rudder angle correcting part is adapted to:

correct the command rudder angle based on the instantaneous value when keeping the course; and correct the command rudder angle based on one of the first estimated value and the second estimated value when turning.

(9) The ship body control device of any one of (1) to (8), wherein the shape of the ship body includes a length, an amount of draft, and a width of the ship body, wherein the ship body control device comprises a derivative calculating part configured to calculate a value including a derivative related to a hydrodynamic force based on the shape of the ship body, as the information on the hydrodynamic force, and wherein the estimating part generates the first estimated value based on the information on the hydrodynamic force calculated by the derivative calculating part.

(10) The ship body control device of (1) or (2), wherein the estimating part calculates an estimated value of the trim rudder angle before turning, and an estimated value of the trim rudder angle after turning, based on the information on the hydrodynamic force of the ship body, and the information acquired by the acquiring part, wherein the estimating part calculates an actual measurement of the trim rudder angle immediately after turning is started, based on the target direction and the heading that are obtained from the direction setting of the ship body, wherein the estimating part generates a third estimated value of the trim rudder angle after turning, based on the actual measurement of the trim rudder angle immediately after turning is started, the estimated value of the trim rudder angle before turning, and the estimated value of the trim rudder angle after turning, and wherein the estimating part generates a fourth estimated value of the present trim rudder angle, based on the present heading, the present direction setting, the direction setting before turning, the actual measurement of the trim rudder angle immediately after turning is started, and the third estimated value.

(11) A ship body control system, comprising:

the ship body control device of any one of (1) to (10);

an anemometer configured to measure a wind speed and a wind direction as the disturbance information;

a ship speed sensor configured to measure a ship speed as the ship body state; and a direction sensor configured to observe the heading as the ship body state.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A ship body control device, comprising:
processing circuitry configured to:
acquire a ship body state of a ship body on a water surface and disturbance information, the disturbance information including a wind speed and a wind direction, and the ship body state including a ship speed and a heading;
estimate a first estimated trim rudder angle with reference to the disturbance information, based on
the ship body state,
the disturbance information, and
information regarding a hydrodynamic force of the ship body, the information being determined based on a shape of the ship body;
estimate a second estimated trim rudder angle based on at least the first estimated trim rudder angle according to the following:

$$\delta te1 = \delta tm \cdot (\delta te0 / \delta te0b)$$

where
δte1 represents the second estimated trim rudder angle,
δte0*b* represents the first estimated trim rudder angle before turning,
δte0 represents the first estimated trim rudder angle of a present heading, and
δtm represents an actual measurement of the trim rudder angle of the present heading;
calculate a command rudder angle based on a target direction and the heading; and
correct the command rudder angle calculated based on the first estimated trim rudder angle or the second estimated trim rudder angle to output a corrected command rudder angle to control a rudder of the ship body during turning of the ship body.

2. The ship body control device of claim 1, wherein the processing circuitry is further configured to:
generate the first estimated trim rudder angle when turning of the ship body.

3. The ship body control device of claim 2, wherein the processing circuitry is further configured to:
correct the command rudder angle based on an instantaneous value when keeping a course of the ship body.

4. The ship body control device of claim 3, wherein
the shape of the ship body includes a length, an amount of draft, and a width of the ship body, and
the processing circuitry is further configured to:
calculate, as the information regarding the hydrodynamic force, a value including a derivative related to a hydrodynamic force based on the shape of the ship body.

5. The ship body control device of claim 1, wherein the processing circuitry is further configured to:
calculate an actual measurement of the trim rudder angle; and
generate the second estimated trim rudder angle of the trim rudder angle based on the first estimated trim rudder angle and the actual measurement.

6. The ship body control device of claim 5, wherein the processing circuitry is further configured to:
calculate an instantaneous value of the trim rudder angle based on the heading and the target direction that are obtained from a direction setting of the ship body, and calculate the actual measurement based on a statistical value of the instantaneous values at a plurality of timings.

7. The ship body control device of claim 6, wherein the processing circuitry is further configured to:
correct the command rudder angle based on the instantaneous value when keeping a course of the ship body.

8. The ship body control device of claim 5, wherein the processing circuitry is further configured to:
calculate an instantaneous value when keeping a course of the ship body, and calculate the actual measurement based on a statistical value of the instantaneous values when the keeping the course.

9. The ship body control device of claim 1, wherein
the shape of the ship body includes a length, an amount of draft, and a width of the ship body, and
the processing circuitry is further configured to:
calculate, as the information regarding the hydrodynamic force, a value including a derivative related to a hydrodynamic force based on the shape of the ship body.

10. A ship body control device, comprising:

processing circuitry configured to:

acquire a ship body state of a ship body on a water surface and disturbance information, the disturbance information including a wind speed and a wind direction, and the ship body state including a ship speed and a heading;

estimating one first estimated trim rudder angle before turning, and another first estimated trim rudder angle after turning, based on the information regarding a hydrodynamic force of the ship body, the ship body state and the disturbance information, calculate an actual measurement of the trim rudder angle immediately after turning is started, based on a target direction that is obtained from a direction setting and the heading of the ship body, estimating a third estimated trim rudder angle after turning, based on the actual measurement of the trim rudder angle immediately after turning is started, the one first estimated the trim rudder angle before turning, and the another first estimated trim rudder angle after turning, according to the following:

$$\delta tma=\delta tmb\cdot(\delta te0a/\delta te0b)$$

where

δtma represents the third estimated trim rudder angle after turning,

δtmb represents the actual measurement of the trim rudder angle immediately after turning is started, δte0*b* represents the first estimated trim rudder angle before turning, and δte0*a* the first estimated trim rudder angle after turning, estimating a fourth estimated trim rudder angle, based on a present heading, a present direction setting, a direction setting before turning, the actual measurement of the trim rudder angle immediately after turning is started, and the third estimated trim rudder angle, calculate a command rudder angle based on the target direction and the heading; and correct the command rudder angle calculated based on the fourth estimated trim rudder angle to output a corrected command rudder angle to control a rudder of the ship body during turning of the ship body.

11. A ship control system comprising the ship body control device of claim 1, wherein the system further comprises:

an anemometer configured to measure a wind speed and a wind direction as the disturbance information;

a ship speed sensor configured to measure a ship speed as the ship body state; and a direction sensor configured to observe the heading as the ship body state.

12. A ship body control method, comprising:

acquiring a ship body state and disturbance information of a ship body on a water surface, the disturbance information including a wind speed and a wind direction, and the ship body state including a ship speed and a heading;

estimating a first estimated trim rudder angle with reference to the disturbance information, based on the ship body state, the disturbance information, and information regarding a hydrodynamic force of the ship body, the information being determined based on a shape of the ship body;

estimating a second estimated trim rudder angle based on at least the first estimated trim rudder angle according to the following:

$$\delta te1=\delta tm\cdot(\delta te0/\delta te0b)$$

where

δte1 represents the second estimated trim rudder angle,

δte0*b* represents the first estimated trim rudder angle before turning,

δte0 represents the first estimated trim rudder angle of a present heading, and δtm represents an actual measurement of the trim rudder angle of the present heading;

calculating a command rudder angle based on a target direction and the heading; and correcting the command rudder angle calculated based on the first estimated trim rudder angle or the second estimated trim rudder angle to output a corrected command rudder angle to control a rudder of the ship body during turning of the ship body.

13. A non-transient computer-readable recording medium, recording a ship body control program, enabling a computer to:

acquire a ship body state of a ship body on a water surface and disturbance information, the disturbance information including a wind speed and a wind direction, and the ship body state including a ship speed and a heading;

estimate a first estimated trim rudder angle with reference to the disturbance information, based on the ship body state, the disturbance information, and information regarding a hydrodynamic force of the ship body, the information being determined based on a shape of the ship body;

estimate a second estimated trim rudder angle based on at least the first estimated trim rudder angle according to the following:

$$\delta te1=\delta tm\cdot(\delta te0/\delta te0b)$$

where

δte1 represents the second estimated the trim rudder angle,

δte0*b* represents the first estimated trim rudder angle before turning,

δte0 represents the first estimated trim rudder angle of a present heading, and δtm represents an actual measurement of the trim rudder angle of the present heading;

calculate a command rudder angle based on a target direction and the heading; and correct the command rudder angle calculated based on the first estimated trim rudder angle or the second estimated trim rudder angle to output a corrected command rudder angle to control a rudder of the ship body during turning of the ship body.

* * * * *